United States Patent [19]

Dubach

[11] Patent Number: 5,544,796
[45] Date of Patent: Aug. 13, 1996

[54] ROOF RACK FOR VEHICLES

[75] Inventor: Fredi Dubach, Bäretswil, Switzerland

[73] Assignee: Milz Produkte AG, Switzerland

[21] Appl. No.: 506,379

[22] Filed: Jul. 24, 1995

[30] Foreign Application Priority Data

Jul. 25, 1994 [CH]  Switzerland ............... 2341/94

[51] Int. Cl.⁶ .................................................. B60R 9/042
[52] U.S. Cl. ..................... 224/310; 224/315; 224/326; 414/462
[58] Field of Search ................... 224/310, 314, 224/315, 326; 414/462

[56] References Cited

U.S. PATENT DOCUMENTS 3,480,166  11/1969  Abbott .
4,826,387   5/1989  Audet ..................... 414/462

FOREIGN PATENT DOCUMENTS

28962/67   4/1970  Australia .
0568855   11/1993  European Pat. Off. .
986618    8/1951  France .
4229762   3/1993  Germany .
135348    7/1985  Japan ..................... 224/310
2073686  10/1981  United Kingdom .
2118501  11/1983  United Kingdom .

*Primary Examiner*—Karen B. Merritt
*Assistant Examiner*—Janice L. Krizek
*Attorney, Agent, or Firm*—Ostrolenk, Faber, Gerb & Soffen, LLP

[57] ABSTRACT

The roof rack is equipped with two parallel tracks having a roof section and a pivotal auxiliary section. For loading or unloading articles, the auxiliary sections are positioned to extend outward and downward from the ends of the roof sections for forming a continuous, rigid track. Sleighs can be displaced along these tracks. The sleighs are guided such that they are not tilted but retain their orientation during displacement. The roof rack is easy to construct and also suitable for heavy and high articles.

12 Claims, 5 Drawing Sheets

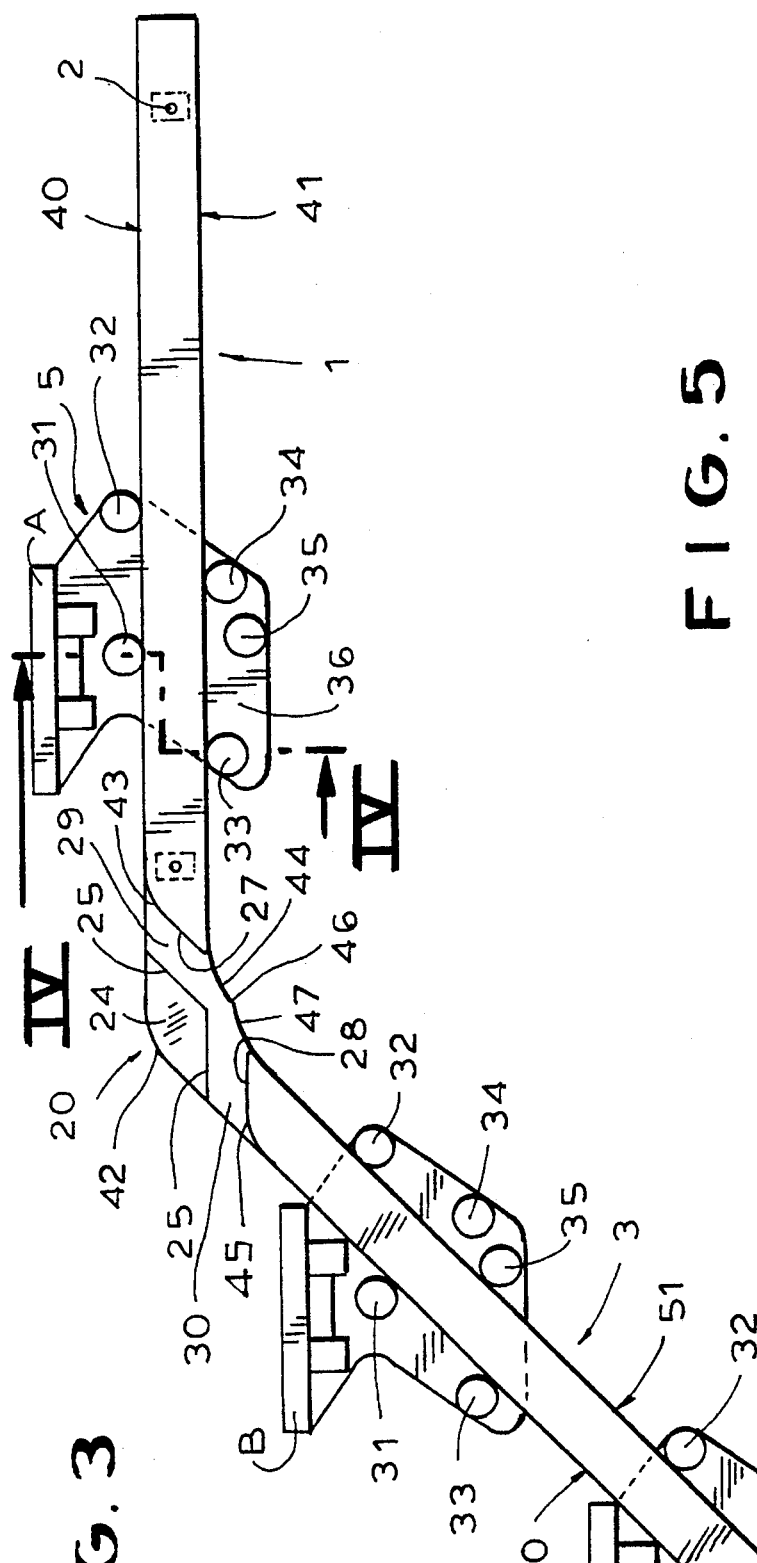
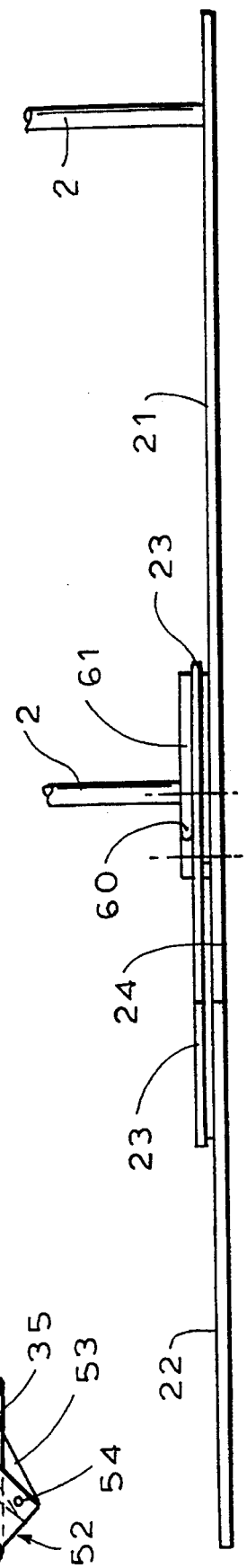

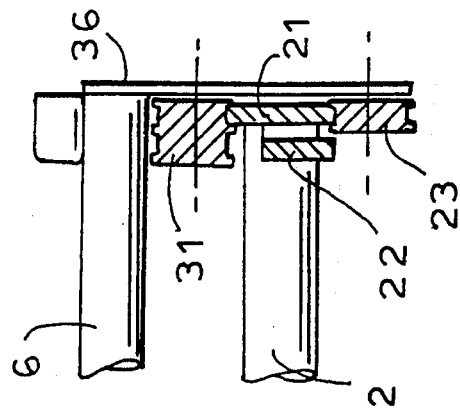
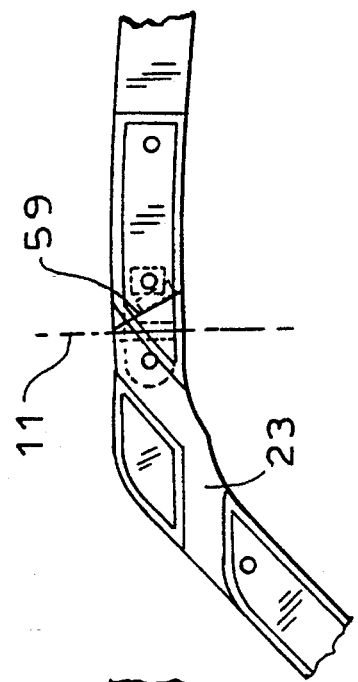
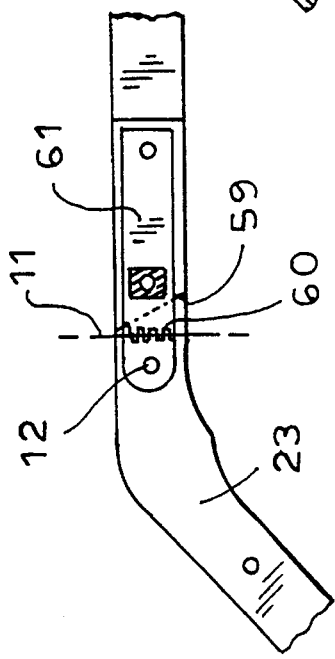
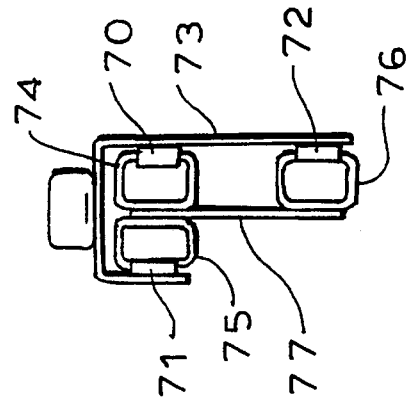
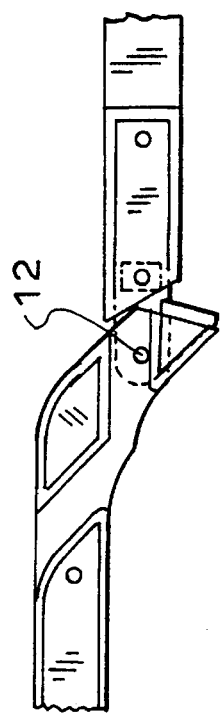

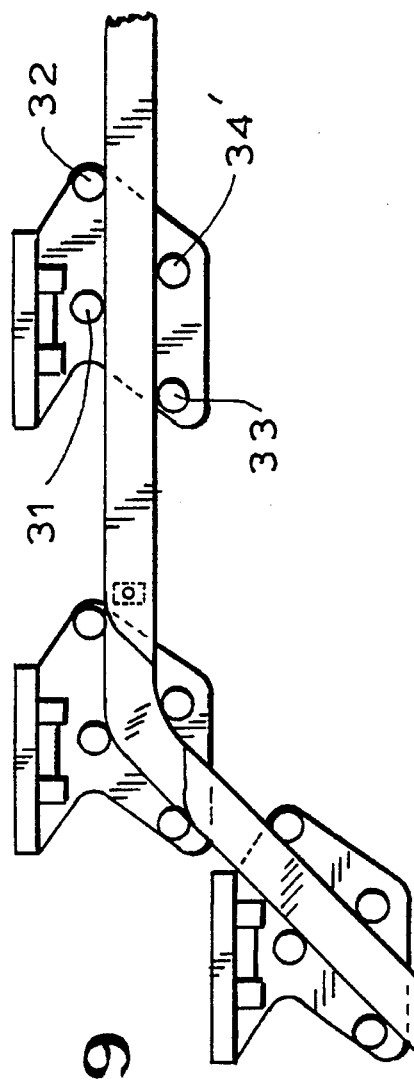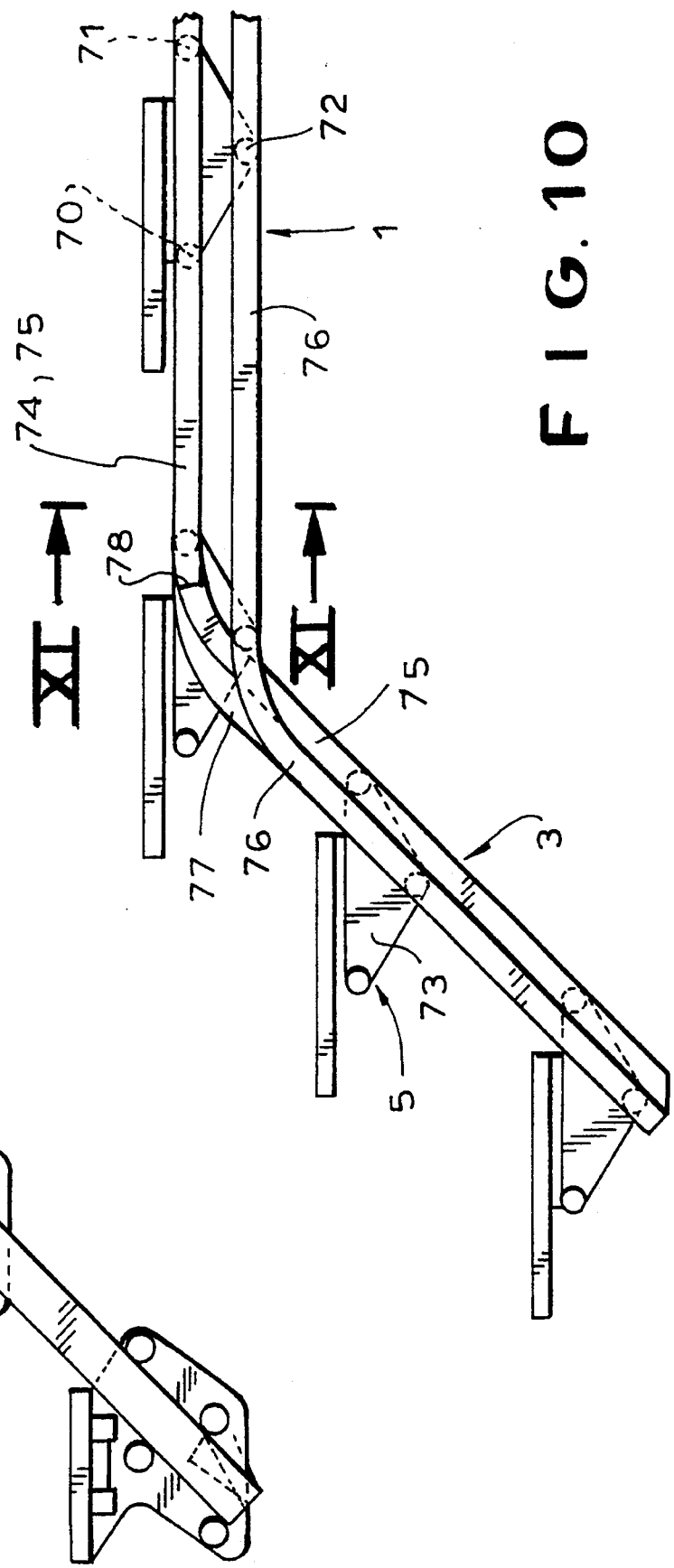

ROOF RACK FOR VEHICLES

BACKGROUND OF THE INVENTION

1. Field of the Invention

The invention relates to a device for supporting a load on a car roof, such as a roof rack for automobiles.

2. Description of the Prior Art

Roof racks are conventionally used for attaching articles, such as skis, bicycles or luggage on the roof of a car. For loading, the articles must be lifted to the height of the roof of the car. Since this can be difficult, especially for heavy articles, roof racks comprising auxiliary lifting mechanisms have been described e.g. in the German patent application DE 42 29 762, the European patent application EP 568 855, the U.S. Pat. No. 4,826,387 and the British patent application 2 073 686. These solutions have in common that they require a large number of movable parts, which makes the racks difficult to construct and unreliable in operation.

The Australian patent AU 28 962/67 and the French patent 986 618 teach a simpler design for roof racks, which is, however, not well suited for lifting heavy, high loads.

SUMMARY OF THE INVENTION

Hence, it is a general object of the invention to provide a device for supporting a load on a car roof with an auxiliary lifting mechanism that is simple in construction and suitable for lifting all kinds of articles.

Now, in order to implement these and still further objects of the invention, which will become more readily apparent as the description proceeds, the device is manifested by the features that it comprises at least one substantially continuous track comprising a horizontal roof section and an auxiliary section extending outward and downward from an end of said roof section and at least one carriage having a receiving member for receiving said load, said carriage being mounted to and displaceable along said track and comprising a plurality of guiding members engaging said track, each of said guiding members following a guiding path when displacing said carriage along said track, wherein each guiding member is guided by said track along at least part of said guiding path and wherein all said guiding paths are parallel, mutually displaced geometrical curves, such that said carriage is prevented from tilting while being displaced along said track.

In another aspect of the present invention, the device comprises at least one substantially rigid track comprising a horizontal roof section and an auxiliary section extending outward and downward from an end of said roof section and at least one carriage for receiving said load, wherein said carriage is mounted to and displaceable along said track and wherein said track and said carriage comprise a guiding mechanism for preventing a tilting of said carriage while displacing said carriage along said track.

Since the roof section and the auxiliary section form together a continuous track for the carriage, the construction of the device becomes simple. The only movement during loading is the relative movement between the carriage and the track. The carriage is guided in such a way that it, or at least its receiving member, is not tilted while the carriage is displaced along the track. Therefore, the article to be loaded is not titled, which makes it easier to load heavy, high or sensitive articles.

Each carriage can be provided with a plurality of guiding means, each of which is guided along at least part of the track. The paths described by the guiding means should preferably be parallel, mutually displaced geometrical curves, which prevents the carriage from being tilted during its displacement along the track.

The guiding means are preferably designed as rollers or gliders, respectively, running along the top or bottom side of the track. These surfaces can be easily cleaned from snow, ice or dirt. This allows to use the device under adverse conditions.

The auxiliary sections can be pivotally mounted to the roof sections such that they can be pivoted to a horizontal position perpendicular to the roof sections. In this position, they can be locked with a suitable locking mechanism which simultaneously also locks the sleighs. This makes it impossible to forget locking the sleighs after loading the rack.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3 is a side view of a track of the roof rack of FIG. 1, FIG. 4 is a section along line IV—IV of FIG. 3, FIG. 5 is a top view of the track of FIG. 4, FIG. 6 is a right side view of the transition area between the roof and auxiliary section of the track, FIG. 7 is a left side view of the transition area of FIG. 6, FIG. 8 is the transition area of FIG. 6 after a rotation about the horizontal axis, FIG. 9 is an alternative embodiment of track and sleigh, FIG. 10 is a side view of a third embodiment of track and sleigh, and FIG. 11 is a section along line XI—XI of FIG. 10.

DESCRIPTION OF THE PREFERRED EMBODIMENTS

Figure 1:
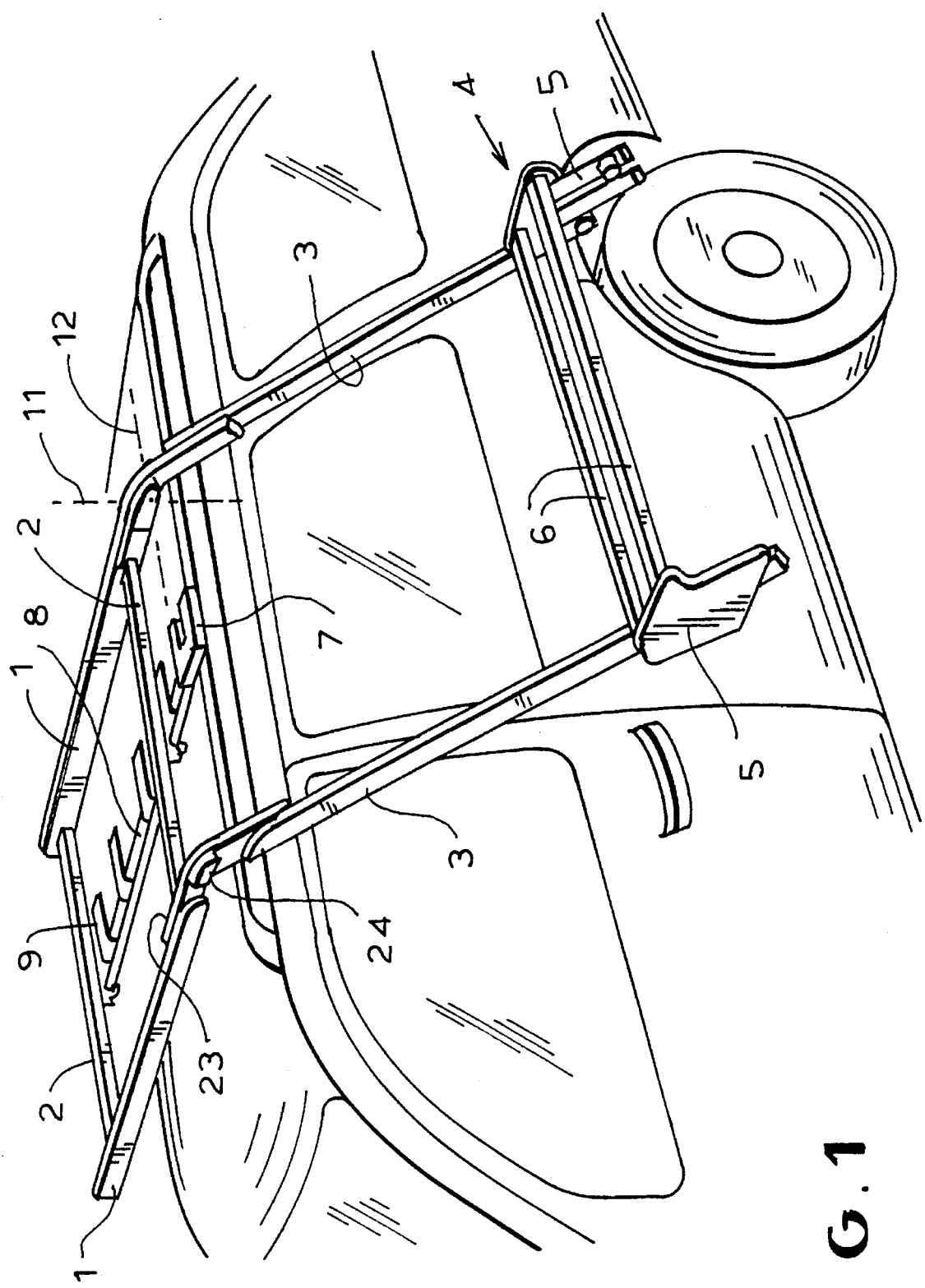
FIG. 1 is a perspective view of a vehicle with a roof rack in loading position.
Figure 2:
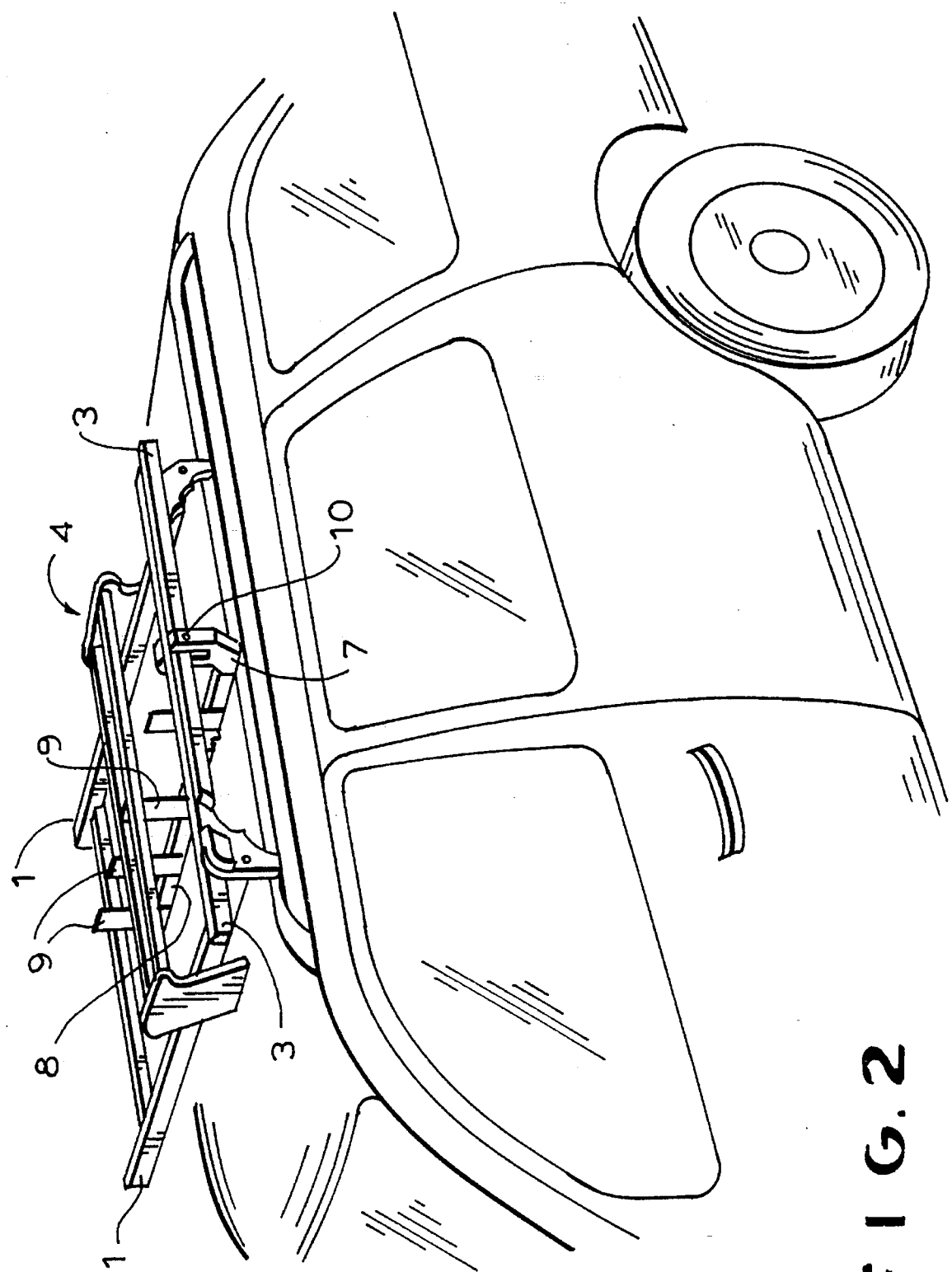
FIG. 2 shows the roof rack of FIG. 1 in its transporting position.

The basic setup and function of the presently preferred embodiment of a roof rack according to the invention is shown in FIGS. 1 and 2. The roof rack comprises two tracks with roof sections 1. In the present embodiment, these tracks are arranged perpendicular to the longitudinal axis of the vehicle. The roof sections 1 are extending horizontally and are attached to the vehicle by conventional attaching means known to the person skilled in the art. Transversal struts 2 are connecting the roof sections 1 of the tracks to form a rigid unit.

An auxiliary section 3 of each track is attached to each roof section 1. The auxiliary sections 3 can be pivoted between a loading position (shown in FIG. 1) and a transporting position (shown in FIG. 2). For carrying out this movement, each track is provided with two joints or hinges, which will be described below.

In the loading position according to FIG. 1 the auxiliary sections 3 are extending downward and outward from the ends of the roof sections 1. In this position, each roof section 1 and its corresponding auxiliary section 3 form a rigid, continuous track. At least one sleigh 4 is mounted on this track. Sleigh 4 comprises two lateral carriages 5 running on the tracks, as well as struts 6 interconnecting the carriages 5 and forming a member for receiving the load. Depending on the articles to be loaded, further attaching means (not shown) may be mounted to struts 6. As it will be described in more detail below, the carriages 5 are guided in the tracks in such a way that they are not tilted while moving along them. Therefore, the article remains upright while being loaded onto or unloaded from the rack.

Once a sleigh 4 is fully loaded or unloaded, respectively, it can be moved along the auxiliary sections 3 onto the roof sections 1 of the tracks.

Once that all sleighs have been loaded or unloaded, respectively, the auxiliary sections 3 of the tracks are not required anymore and can be pivoted into their transporting position shown in FIG. 2. In this position, the auxiliary sections 3 are extending laterally along the roof rack and are held by a U-shaped bracket 7 in their middle.

U-shaped bracket 7 is part of a locking mechanism comprising a longitudinal axle 8 and locking members 9. The locking mechanism is pivotal about longitudinal axle 8. During loading or unloading, it is in the position shown in FIG. 1, where the locking members 9 are parallel to the roof of the vehicle. In this position, they do not obstruct a movement of the sleighs 4. Once that loading or unloading is done, the locking mechanism is rotated about axle 8 such that the locking members 9 extend between the struts 6 of the suitably positioned sleighs 4 and lock them. Then, auxiliary sections 3 are pivoted upwardly and inwardly about tilting axes 11 and 12 and introduced into U-shaped bracket 7 from above, and U-shaped bracket 7 can be closed by a lock 10. Now, the sleighs 4 and the auxiliary sections 3 are secured in their transporting positions.

In the following, the constructive details of the preferred embodiment of the roof rack will be described.

As can be seen from FIG. 1 in combination with FIGS. 3–5, each track has two straight track sections interconnected through a curved section 20. In the straight track sections each track consists of a straight metal profile 21, 22 (FIG. 5) with rectangular cross section. In curved section 20 these metal profiles 21, 22 are interconnected by means of a lateral curved plate 23, which also has a rectangular cross section. An auxiliary plate 24 is mounted to curved plate 23, the arrangement of which is best seen in FIG. 1. Auxiliary plate 24 has the same thickness as the metal profiles 21, 22 such that guiding recesses 29, 30 are formed between auxiliary plate 24 and the metal profiles 21, 22.

Each carriage 5 comprises five guiding rollers 31–35 mounted to a vertical base plate 36. Base plate 36 is arranged on the side of the track with the recesses 29, 30. The length of rollers 31, 34 and 35 corresponds approximately to the thickness of the track in the area of the curved section 20. Rollers 32 and 33 are shorter, their length corresponds approximately to the width of the profiles 21, 22. As it can be seen from FIG. 4, rollers 31, 34 and 35 are approximately twice as long as rollers 32 and 33.

When a carriage is located in the area of roof section 1 (position A in FIG. 3), rollers 31 and 32 are running on the top side 40 and rollers 33 and 34 on the bottom side 41 of the track. If the sleigh is moved from position A towards curved section 20, roller 33 comes free and then enters guiding recess 30. At the same time, long roller 31 is guided on curved plate 23 until it reaches the curve 42. Curves running parallel thereto are formed at the ends 43 and 45 of the guiding recesses 29, 30 and in the area 44 of the bottom side of curved plate 23. Therefore, carriage 5 now begins its downward motion without being tilted. Roller 32 enters guiding recess 29 and roller 33 leaves guiding recess 30. Roller 34 looses contact with curved plate 23 in point 46 and is replaced in its function by roller 35, which follows curve 47 of curved plate 23. In this way, carriage 5 arrives at position B on auxiliary section 3. Rollers 31 and 33 are now running on the outer side 50 and rollers 32 and 35 on the inner side 51 of the track.

If carriage 5 is further displaced towards the end 52 of auxiliary section 3, roller 35 runs against a stopping lever 53 (position C). Lever 53 is mounted pivotally about an axis 54 and extends, in its resting position, over the surface of bottom side 51. If the sleigh is to be removed from the track, lever 53 can be pushed into the track and carriage 5 can be moved over it. When the sleigh is pushed back into the tracks, lever 53 is automatically urged inward by rollers 32 and 35.

As it can be seen from FIG. 3, the carriages 5 are shaped such that they can be pushed close together on the roof section of the track. On a normal car roof there is sufficient room for four or more sleighs.

The auxiliary sections 3 can be pivoted about the two axes 11 and 12. The corresponding hinges have been omitted in FIG. 3 and are shown in more detail in FIGS. 5–7.

The line of separation between pivotal auxiliary section 3 and stationary roof section 1 runs through a cut 59 in curved plate 23. A hinge 60 in a hinge plate 61 allows a pivoting motion about vertical axis 11. Hinge plate 61 is arranged on the outer side of curved plate 23. A further joint is provided at the intersection of axis 12 between hinge plate 61 and curved plate 23 for allowing pivotal movement about a horizontal axis. FIG. 8 shows the roof section and auxiliary section after a rotation about axis 12.

In the following, some further embodiments of the invention are shown by referring to FIGS. 9–11.

In the embodiment of FIG. 9, the carriages only have four rollers, wherein roller pair 34, 35 is now replaced by a single roller 34', which has equal distances from rollers 32 and 33. This solution has a simpler design than the one of FIG. 3 but provides a less secure guidance of the carriage in the transition between roof section 1 and auxiliary section 3.

In the track of FIG. 9, auxiliary plate 24 is not used. This plate is geometrically not necessary for guiding the carriage of FIG. 3 or 9 but improves the stability in the transition section.

Another embodiment is shown in FIGS. 10 and 11. The carriage shown here only has three rollers or gliders 70, 71, 72. These are mounted to a curved base bracket 73 and are running in three U-profiles 74–76 of the track. The U-profiles 74–76 are mounted to a plate 77.

U-profile 74 only extends along the roof section and ends in point 78. U-profiles 75 and 76 both describe the same geometrical curve but are mutually displaced such that the carriage retains its orientation while running along the track. In roof section 1, the sleigh is guided by all rollers 70–72, in auxiliary section 3 by rollers 71 and 72 while roller 70 is free.

Similarly to the embodiment of FIG. 3, auxiliary section 3 of FIG. 10 can be pivoted from a loading position to a transport position. Instead of using pivotal auxiliary sections, all embodiments shown here can also be designed to have removable auxiliary sections. In this case, the auxiliary sections 3 are removably mounted to the roof sections and are unmounted after use to be stored e.g. in the trunk of the car. This has the advantage that it becomes possible to attach the auxiliary sections of the tracks from either sides of the car.

The embodiment of FIGS. 10 and 11 is somewhat easier to construct than the embodiment of FIG. 3, but it has the disadvantage that the U-profiles of the tracks can easily be blocked by dirt or snow.

In the embodiments shown here, a tilting of the carriage while displacing it along the track is prevented by guiding the rollers along geometrically identical, parallel but displaced guiding paths. In the straight sections these paths run parallel to each other. In the curved section of the track, the mutual distance between the curves changes depending on the arrangement of the rollers. If the guiding curves are intersecting such as shown in FIGS. 3 and 10, suitable crossings must be provided.

As it is shown in the example of FIG. 10, it is not necessary to guide the rollers along the whole guiding paths. Depending on the geometric situation, the rollers can be unguided in parts of their way. In principle, it is sufficient if two rollers are guided at every moment. For increasing the stability it is, however, often advisable to guide more than two rollers along at least part of the track.

While there are shown and described presently preferred embodiments of the invention, it is to be distinctly understood that the invention is not limited thereto but may be otherwise variously embodied and practiced within the scope of the following claims.

I claim:

1. A device for supporting a load on a vehicle's roof comprising:

at least one substantially continuous track including a horizontal roof section and an auxiliary section extending outward and downward from an end of said roof section, and at least one carriage for receiving said load, said carriage being mounted to and displaceable along said track and includes a plurality of guiding members engaging said track, each of said guiding members following a guiding path when displacing said carriage along said track, wherein each guiding member is guided by said track along at least part of said guiding path and wherein all said guiding paths are identical, parallel, mutually displaced geometrical curves, such that said carriage is prevented from tilting while being displaced along and between said roof and auxiliary sections of said track.

2. The device of claim 1 wherein said carriage includes at least three of said guiding members, wherein along at least part of said roof section said guiding paths of a first and a second of said guiding members coincide and are at a distance from said guiding path of a third guiding member, and wherein along at least part of said auxiliary section said guiding paths of said first and said third guiding members coincide and are at a distance from said guiding path of said second guiding member.

3. The device of claim 2 wherein said carriage further comprises a fourth guiding member, wherein along at least part of said roof section said guiding path of said fourth guiding member coincides with said guiding path of said third guiding member, and wherein along at least part of said auxiliary section said guiding path of said fourth guiding member coincides with said guiding path of said second guiding member.

4. The device of claim 3 wherein said roof section includes a straight roof track section having constant thickness and wherein said auxiliary section includes a straight auxiliary track section having constant thickness, wherein along said roof track section said guiding path of said first and said second guiding members extend adjacent to a top side of said roof track section and said guiding path of said third and fourth guiding members extend adjacent to a bottom side of said roof track section, and wherein along said auxiliary track section said guiding path of said first and said third guiding members extend adjacent to a top side of said auxiliary track section and said guiding path of said second and fourth guiding members extend adjacent to a bottom side of said auxiliary track section.

5. The device of claim 4 wherein said guiding members are mounted to a base body of said carriage, wherein said base body is located at a carriage-side of said track, wherein said first and fourth guiding members extend further from said base body than said second and third guiding members, and wherein said track includes a recess located in said carriage-side between said roof section and said auxiliary section, wherein said guiding paths of said second and third guiding members extend along said recess.

6. The device of claim 4 wherein said first, second and third guiding members each comprise one roller and said fourth guiding means comprises at least two rollers.

7. The device of claim 1 wherein said auxiliary section of said track is pivotally connected to said roof section of said track and is pivotal from a position extending outward and downward from said end of said roof section to a horizontal position substantially perpendicular to said roof section.

8. The device of claim 7 wherein said auxiliary section is pivotal about two non-parallel axes.

9. The device of claim 1 comprising two of said tracks extending parallel to each other and at least one carriage on each track, wherein each carriage on a first track is connected to one carriage on a second track to form a loading sleigh.

10. The device of claim 9 further comprising a locking mechanism arranged between said two tracks, said locking mechanism comprising an axis and at least one locking member extending transversally from said axis, said locking member being pivotal about said axis between an opened and a closed position, and wherein in said closed position said locking member engages said loading sleigh arranged close to said locking member.

11. The device of claim 10 wherein said auxiliary section of each track is pivotally connected to said roof section of said track and is pivotal from a position extending outward and downward from said end of said roof section to a horizontal position substantially perpendicular to said roof section, and wherein said locking mechanism comprises an auxiliary locking means for engaging said auxiliary sections in said horizontal position when said locking member is in said closed position.

12. A device for supporting a load on a vehicle's roof comprising:

at least one substantially rigid track including a horizontal roof section and an auxiliary section extending outward and downward from an end of said roof section, and at least one carriage for receiving said load, wherein said carriage is mounted to and displaceable along said track and wherein said track and said carriage comprise a guiding mechanism for preventing a tilting of said carriage while said carriage is displaced along and between said roof and said auxiliary sections of said track.

* * * * *